(12) United States Patent
Murray

(10) Patent No.: US 9,547,995 B1
(45) Date of Patent: Jan. 17, 2017

(54) DYNAMIC INSTRUCTIONAL COURSE

(71) Applicant: Google Inc., Mountain View, CA (US)

(72) Inventor: Abraham Murray, Scituate, MA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 14/083,008

(22) Filed: Nov. 18, 2013

(51) Int. Cl.
*G09B 5/06* (2006.01)
*G09B 7/00* (2006.01)

(52) U.S. Cl.
CPC .. *G09B 5/06* (2013.01); *G09B 7/00* (2013.01)

(58) Field of Classification Search
CPC ............... G09B 5/06; G09B 5/08; G09B 5/14; G09B 7/00; G09B 7/02; G09B 7/07
USPC ........................................................ 434/308
See application file for complete search history.

(56) References Cited

U.S. PATENT DOCUMENTS

| 2002/0168621 | A1* | 11/2002 | Cook | ........................ | G09B 7/00 434/350 |
|---|---|---|---|---|---|
| 2008/0131864 | A1 | 6/2008 | Redd et al. | | |
| 2010/0021877 | A1* | 1/2010 | Butler | .................... | G09B 5/065 434/322 |
| 2010/0151431 | A1* | 6/2010 | Miller | ..................... | G09B 7/00 434/350 |
| 2011/0177480 | A1 | 7/2011 | Menon et al. | | |
| 2014/0057240 | A1* | 2/2014 | Colby | ..................... | G09B 7/02 434/350 |

\* cited by examiner

*Primary Examiner* — Robert J Utama
*Assistant Examiner* — Kristen Dragon
(74) *Attorney, Agent, or Firm* — Fish & Richardson P.C.

(57) ABSTRACT

The present disclosure provides systems and techniques for delivering a realistic, engaging, personalized, online version of the case method pedagogy to one student or hundreds of thousands of students worldwide. A method may include presenting a first segment of instructional course content to a first user. A first input may be received from the first user and a portion of the first input that is associated with a second segment of instructional course content may be identified. As a result, the second segment of instructional course content may be presented to the first user. The method may also include receiving a second input from the first user. A portion of the second input that is associated with a third segment of instructional course content may be identified. Accordingly, the third segment of instructional course content may be presented to the first user.

17 Claims, 4 Drawing Sheets

DYNAMIC INSTRUCTIONAL COURSE

BACKGROUND

Online courses are becoming increasingly popular for several factors such as worldwide accessibility and the variety of course subject areas offered by course providers. Students of these online courses typically receive traditional course materials such as videos, readings and problem sets, as well as interactive user forums that may help to build a community for the students, professors, and teaching assistants. In general, users of online courses are presented with pre-set course materials for an overall course subject area, which may cover multiple course topics. These pre-set course materials are usually in the form of reading materials and/or pre-recorded videos for the user to read/view. In addition, the user may be asked to engage in course work, activities, and/or assessments associated with the overall course subject area and/or specific course topics in the subject area. The user may be graded based on his performance in the course work, activities, and/or tests. Depending on the user's performance, portions of the course material may be suggested for the user to re-read/re-view and/or supplemental course materials may be suggested to the user, perhaps to improve his performance in the overall course subject area or in a specific course topic.

BRIEF SUMMARY

According to an embodiment of the disclosed subject matter, a method may include presenting a first segment of instructional course content to a first user. A first input may be received from the first user. Next, a portion of the first input that is associated with a second segment of instructional course content may be identified. As a result, the second segment of instructional course content may be presented to the first user.

An implementation of the disclosed subject matter provides a system including a processor configured to present a first segment of instructional course content to a first user. A first input may be received from the first user. A portion of the first input that is associated with a second segment of instructional course content may be identified. Next, the second segment of instructional course content may be presented to the first user.

Implementations of the disclosed subject matter provide systems and techniques that deliver a realistic, engaging, personalized, online version of the case method pedagogy to one student or hundreds of thousands of students worldwide. In particular, according to the disclosed subject matter the case method pedagogy is implemented in an automated course, allowing students around the world to participate together in such case method educational experiences. Presenting instructional course content to a user that is relevant to input received from the user may allow each user to experience a unique customized instructional course. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
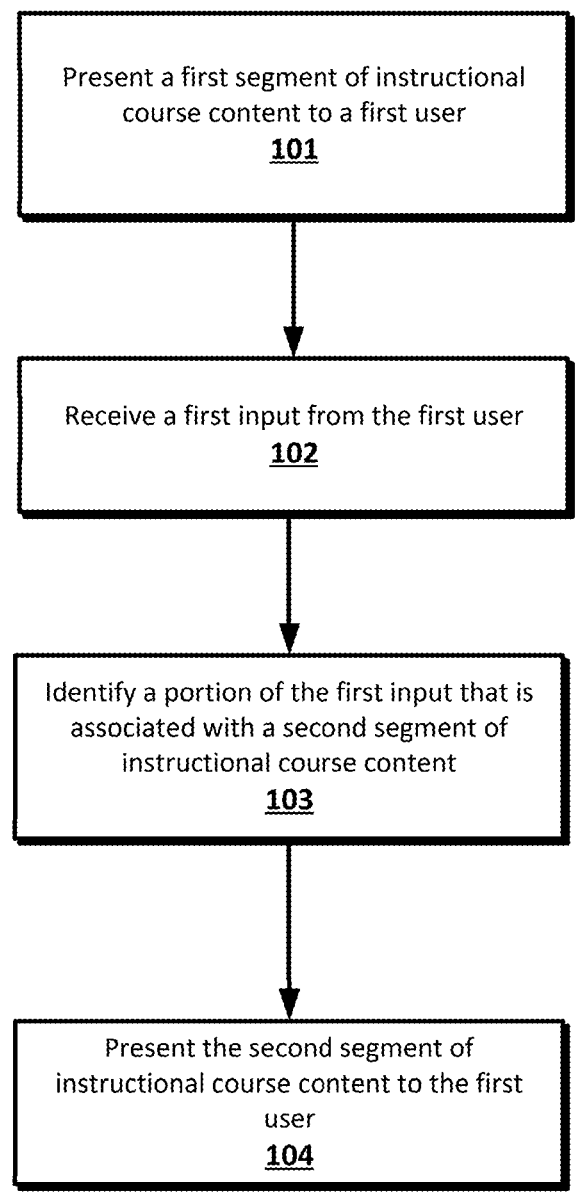
FIG. 1 shows an example process according to an implementation of the disclosed subject matter.

Online courses, such as massive open online courses, have limited pedagogy today and provide instructional course content related to an overall course subject matter and pre-set course objectives. This instructional course content typically only includes videos, reading materials, activities, peer-to-peer interaction, and assessments. It can be challenging, however, for a user to receive a customized course experience from traditional online courses since the course objectives, videos, reading materials, activities, and assessments are generally pre-set and focused on an overall course subject matter. In some instances, a user's performance may be measured, for example at the end of the course, and used to suggest course materials for a user to repeat or supplement the course in order for the user to achieve the pre-set course objectives. Modern pedagogy, however, calls for a more interesting and dynamic instructional technique with increased user participation and a customized course path based on a user's interests and development throughout the course. In particular, the case method teaching approach has been largely popular in the traditional business school setting but has not been implemented in an online platform.

The case method is a form of instructor-guided, discussion-based learning. It introduces complex and often ambiguous real-world scenarios into the classroom, typically through a case study with a protagonist facing an important decision. In general, case method instructors use questions, dialogue, debate, and the application of analytical tools and frameworks to engage students in a challenging, interactive learning environment. It has been said that the case method pedagogy allows for learning that goes beyond the transfer of knowledge to include the development of analytical, decision-making, and communication skills, and the cultivation of self-awareness, judgment, and the capacity to lead. Typically, students may be given a case to read and then, during a class session, they may participate in an instructor led discussion attempting to "crack the case". Generally, in a case method classroom, both the instructor and the student must be active in different ways. Each may be dependent on the other to bring about teaching and learning, and the interaction between the instructor and the student can guide the trajectory of the course. Because of the need for discussion and interaction in the case method pedagogy, this educational experience has been limited to those students who enroll in a traditional business school setting. As such, this educational experience has not yet been provided in an online course. The present disclosure provides systems and techniques for implementing the case method pedagogy to an automated course, allowing students around the world to participate together in such case method educational experiences.

In general, the present disclosure provides systems and techniques that deliver a realistic, engaging, personalized, online version of the case method pedagogy to one student or hundreds of thousands of students worldwide. The instructional course may begin with presenting instructional course content to a user. An instructional course may be divided into multiple segments of instructional course content. As an example, the structure of the segments of the instructional course may be branched such that there may be multiple possible paths each user may take in the course. For example, the multiple segments of the instructional course may be organized in a branch arrangement such that a user may be navigated from one segment to another segment within the course based on input received from the user during the course. In this arrangement, each user of the instructional course may be presented with multiple segments of instructional course content that are relevant to the user's input, thereby providing each user with a customized instructional course.

Instructional course content may be presented to a user in a variety of formats, such as a video, an audio recording, a manuscript, a presentation, a document, a text scroll, a transcript, a discussion, a live broadcast and the like. Taking a video course as an example, the video may be broken up into segments of instructional course content. For example, a video of a first segment of the instructional course content may be presented to a user. Input may be received from the user, for example, at some time during the first segment or at the end of the first segment. The user's input may be provided unprompted or unrequested, or in response to a request for input provided to the user. For example, the user's input may be an audio recording, text input, a selection of an answer to a question, a document, a presentation, a pitch, a verbal discussion, a video recording, and the like. The user's input may be evaluated to identify a second segment of instructional course content that is associated with a portion of the user's input. For example, discussion of a topic in the course may shift based on the input received from the user. As a result, the second segment of instructional course content may be presented to the user. This technique for identifying and selecting subsequent segments of instructional course content based on the user's input may be performed multiple times throughout the instructional course until the end of the course is reached.

An example of an online instructional course may be as follows. A student may be provided a case to read before the course begins. Once the student has read the case, she may begin the class portion of the case method instructional course. The student may be presented with a first segment of instructional course content in the form of a video. The student may watch the first segment which may include a video showing the professor opening the class and may end with the professor asking another student to summarize the case. At this point, input may be requested from the user asking the student to summarize the case via a variety of input options such as submitting a video or audio response that may be recorded; submitting a text entry, and the like. There may be 3 possible segments that may be presented to the student, each segment displaying a previously recorded case summary provided by another student. Each of the previously recorded case summaries may be associated with a different discussion topic associated with the case. The input received from the student may be evaluated to identify a specific discussion topic associated one of the 3 previously recorded case summaries. For example, evaluating input received from a user may be by text recognition, speech recognition, keyword identification, natural language processing, and the like. Techniques for evaluating input received from a user are described below. Based on the specific discussion topic identified from the input received from the student, a second segment of instructional course content, i.e., one of the 3 previously recorded case summaries, may be selected and presented to the student.

In another segment of instructional course content, the professor may ask a question of the class. The student may be asked if she would like to respond. If the student would like to respond, the user may provide input such as audio, video, or a text response. Based on the user's input, a portion of the user's input may be identified as being associated with another segment of instructional course content. The other segment of instructional course content may be presented to the student when it is identified based on the user's input or at the completion of the current segment.

As another example, during a first segment, the professor may ask "what is the most important thing the CEO should do now?" A user's response to this question may be evaluated by text recognition, speech recognition, keyword identification, natural language processing, and the like. Depending on the user's response, there may be 3 possible branches to proceed in the instructional course, each branch including one or more segments of instructional course content. For example, segment A may be for student responses associated with bankruptcy, segment B may be for responses associated with re-structuring, and segment C may be for responses associated with engaging an expert. In response, a first student may input a text entry stating "they should hire a bankruptcy lawyer and wind down the company." A second student's text entry input may state "the CEO should contact an expert consultant to advise the company." Based on an identification of "bankruptcy" in the first student's input, segment A associated with bankruptcy may be presented to the first student. Segment A may show a pre-recorded video including another student discussing the bankruptcy process and the ensuing student and professor discussion. Based on an identification of "expert consultant" in the second student's input, segment C associated with engaging an expert may be presented to the second student. Segment C may show a pre-recorded video including another student discussing the process of selecting an expert consulting company and the possible outcomes of taking this approach.

In general, methods for presenting segments of instructional course content based on input received from a user are provided. FIG. 1 shows an example process according to an implementation of the disclosed subject matter. A method may include presenting a first segment of instructional course content to a first user, at 101. A segment of instructional course content may be a video, an audio recording, a presentation, a document, a text scroll, a transcript, a discussion, a live broadcast, and the like. Next, a first input may be received from the first user, at 102. Input received from a user may be an audio recording, text input, a selection of an answer to a question, a document, a presentation, a pitch, a verbal discussion, a video recording, and the like. In some instances, input may be received from a user at any point during a segment of instructional course content. For example, an interface may be provided to a user including a section in which a user may indicate he wishes to provide input, unprompted or unrequested from the user. In some instances, the input may be received from the user in response to a request for input provided to the user. A request for input provided to a user is distinct from instructional course content described above. For example, a request for input provided to the user may be a question, a discussion topic, a request for a user's viewpoint, a multiple choice question, and the like. In some cases, the input may be an explicit selection, received from a user, of a second segment of instructional content from among a plurality of segments of instructional content. For example, the user may be able to create his own customized instructional course by explicitly selecting multiple segments of instructional course content he wishes to view.

Next, at 103, a portion of the first input that is associated with a second segment of instructional course content may be identified. Accordingly, the second segment of instructional course content may be selected based on the portion of the first input associated with the second segment of instructional course content. As a result, the second segment of instructional course content may be presented to the first user, at 104. The second segment of instructional course content may be input received from one or more other users, a video, an audio recording, a presentation, a document, a text scroll, a transcript, a discussion, a live broadcast, and the like.

The method of receiving input from a user and selecting a subsequent segment of instructional course content based on the received input may be repeated throughout the instructional course. For example, the method may also include receiving a second input from the first user and identifying a portion of the second input that is associated with a third segment of instructional course content. As a result, the third segment of instructional course content may be presented to the first user.

Identifying a portion of input, received from a user, associated with a segment of instructional course content may be performed according to various techniques. Evaluating input received from a user may be by text recognition, speech recognition, keyword identification, natural language processing, and the like. Some examples of such techniques may be real-time human evaluation of input received from a user or a machine learning system for evaluating user input and matching the user input with a segment of instructional course content. Another technique may be to extract a keyword from the user input and match the extracted keyword with a keyword associated with a segment of instructional course content. Any other technique for identifying a portion of user input associated with a segment of instructional course content may be used.

According to an implementation of the disclosed subject matter, the methods for presenting segments of instructional course content based on input received from a user may be implemented in a platform available to multiple users. As such, the subject matter disclosed herein may be scaled such that it may be available to millions of users located all over the world. In this case, each user of the instructional course may be presented with his/her own unique instructional course path including multiple segments, each segment being presented to the user based on the user's input received throughout the course. For example, the method described above with regard to FIG. 1 may also include presenting the first segment of instructional course content to a second user and receiving a third input from the second user. A portion of the third input that may be associated with a fourth segment of instructional course content may be identified. As a result, the fourth segment of instructional course content may be presented to the second user. As an example, both Art and Bobby may be enrolled in an instruction course. A first segment of instructional course content may be presented to both Art and Bobby. Following presentation of the first segment, input may be received from each of Art and Bobby. The input received from Art may be evaluated and a portion may be identified as being associated with a second segment of instructional course content. As a result, the second segment may be presented to Art. The input received from Bobby may be evaluated and a portion may be identified as being associated with a third segment of instructional course content. As a result, the third segment of instructional course content may be presented to Bobby. In some instances, the second segment may not be presented to Bobby in his course and the third segment may not be presented to Art in his course. As such, although Art and Bobby are enrolled in the same instructional course and were both presented with the first segment of instructional course content, each of their paths in the course is different as a result of the input received from each of them.

Figure 2:
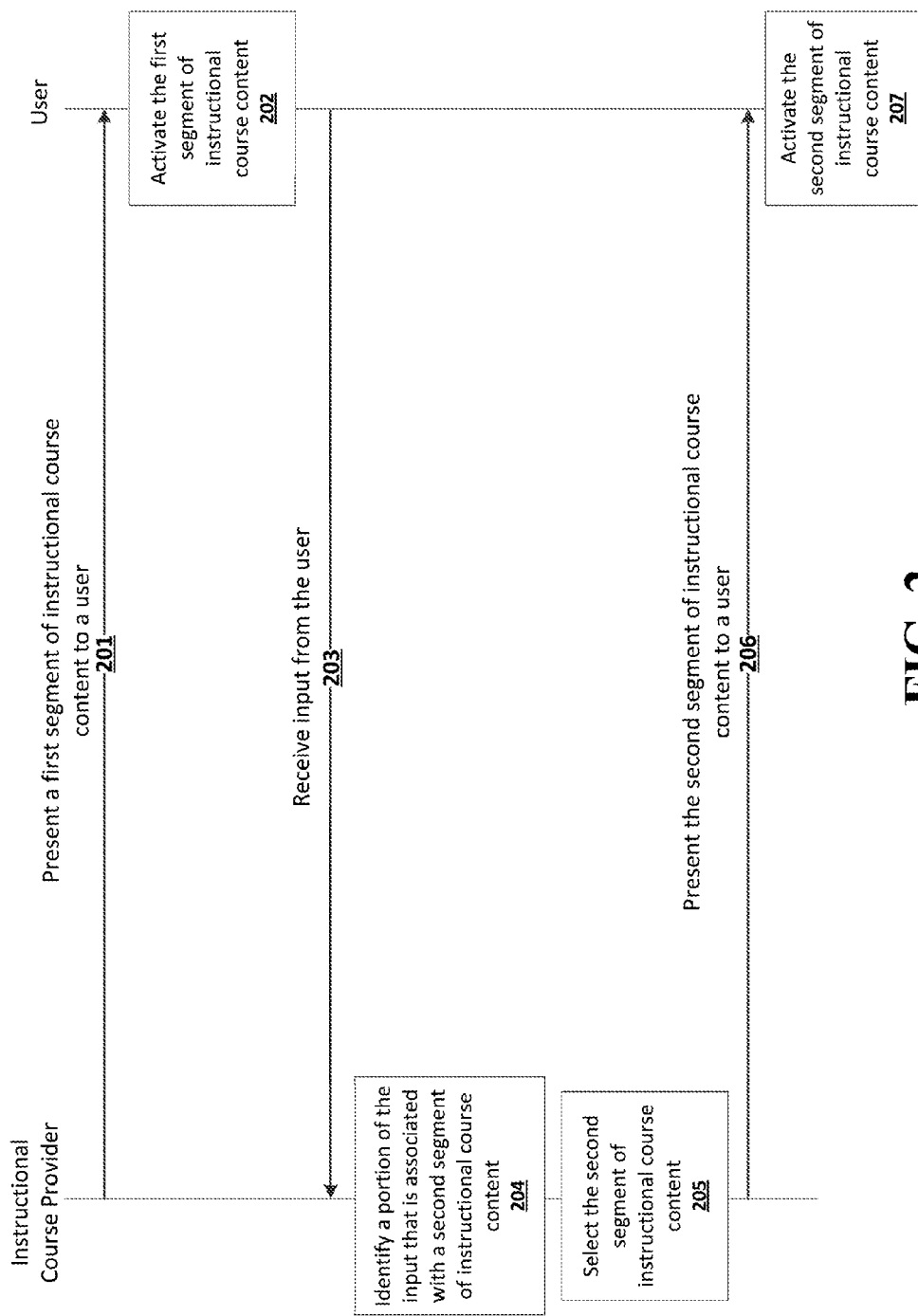
FIG. 2 shows an example information flow according to an implementation of the disclosed subject matter.

An implementation of the disclosed subject matter provides a system for presenting a segment of instructional course content to a user based on input received from the user. An example information flow according to an implementation of the disclosed subject matter is shown in FIG. 2. For example, an instructional course provider may provide a system which may include a processor configured to present a first segment of instructional course content to a first user, at 201. The user may activate the first segment of instructional course content at 202. Activating a segment of instructional course content may be an action such as playing, viewing, listening, scrolling, watching, displaying, and the like. Next, the instructional course provider may receive a first input from the first user, at 203. The instructional course provider may identify a portion of the first input that is associated with a second segment of instructional course content, at 204. Based on the portion of the first input that is associated with a second segment, the second segment of instructional course content may be selected, at 205, by the instructional course provider. Accordingly, the instructional course provider may present the second segment of instructional course content to the user, at 206, and the user may activate the second segment, at 207.

Figure 3:
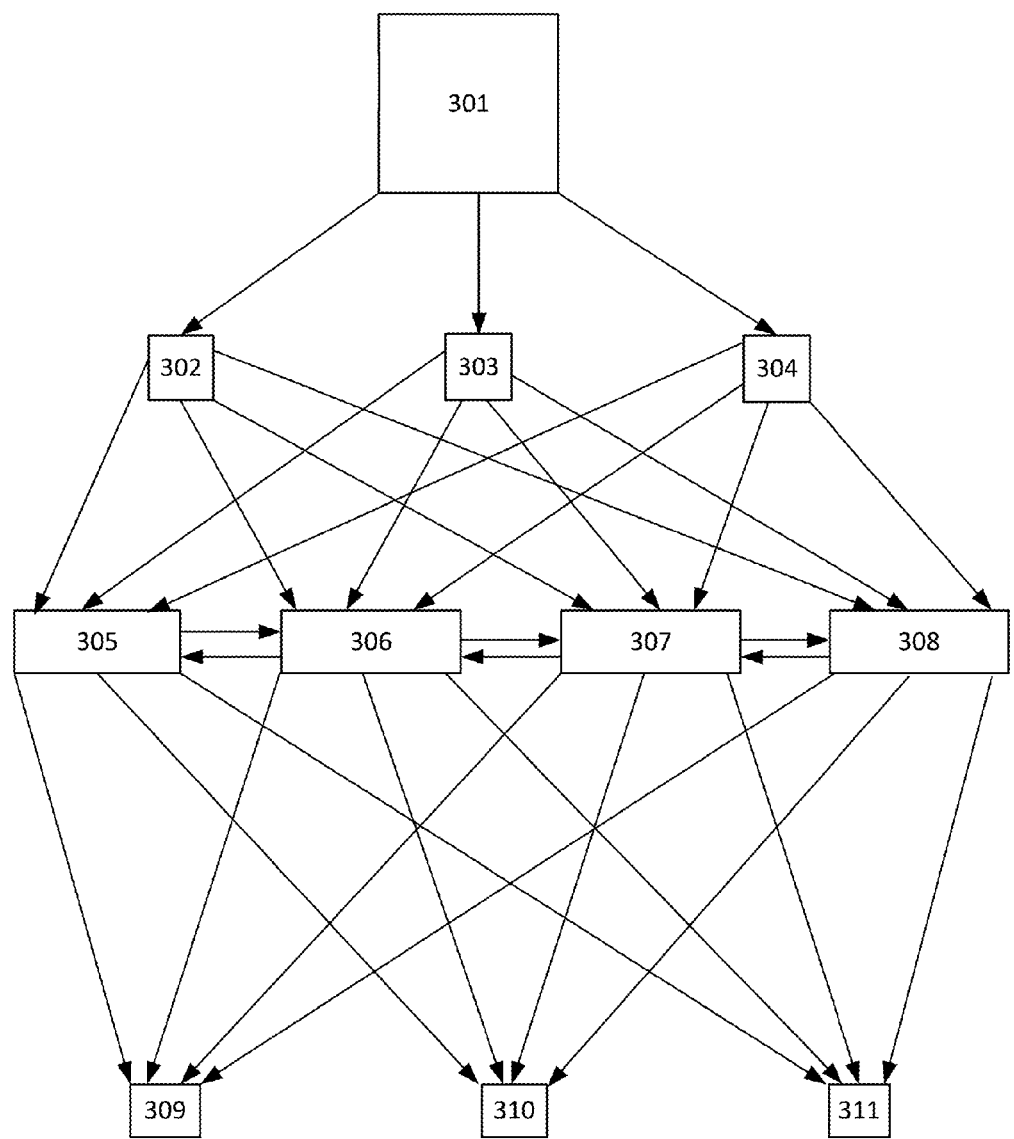
FIG. 3 shows instructional course content according to an implementation of the disclosed subject matter.

As described herein, an instructional course may be divided into multiple segments of instructional course content. FIG. 3 shows instructional course content according to an implementation of the disclosed subject matter. For example, an instructional course may be structured according to a branched organization as shown in FIG. 3. The instructional course may be attended by millions of users worldwide. As an example there may be three specific users, e.g., Art, Bobby, and Claire, each having a unique user course path in the instructional course. The instructional course may begin by presenting a first segment of instructional course content 301 to Art, Bobby, and Claire. The first segment of instructional course content 301 may include presentation of a case addressing an issue that occurred at Company A's factory. Following the first segment 301, a request for input may be provided to each of the users, for example, the request for input may ask the users "what's at stake here?" In response, input may be received from each of Art, Bobby, and Claire. A portion of Art's input may be identified as being associated with instructional course content segment 303. Accordingly, instructional course content segment 303 may be presented to Art. A portion of the input received from Bobby may be identified as being associated with instructional course content segment 302 which, as a result, may be presented to Bobby. Additionally, the input received from Claire may be associated with instructional course content segment 304. Instructional course content segment 304 may be presented to Claire.

While instructional course content segment 302 is being presented to Bobby, he may decide to provide input, such as a comment regarding a discussion topic being discussed during instructional course content segment 302. Although presentation of instructional course content segment 302 has not completed, instructional course content segment 307, which may be associated with the input received from Bobby, may be presented to Bobby. During presentation of a discussion topic in instructional course content segment 307, Bobby may provide his summary of a problem with the manager of the factory identified during the discussion. For example, Bobby may provide his viewpoint on why he believes the manager of the factory should be fired. According to an implementation, a segment of instructional content may be generated based upon an input provided by a user in response to a segment of instructional content. For example, Bobby's input in which he provides his viewpoint on why he believes the manager of the factory should be fired may be used to generate instructional course content segment 310 which may be presented to other users.

Based on input received from Art following instructional course content segment 303, instructional course content segment 305 may be selected as being associated with an identified portion of Art's input. Instructional course content segment 305 may be presented to Art. A request for input may be provided to Art asking for his answer to a question based on a discussion topic addressed during instructional course content segment 305. For example, Art may be asked to answer a multiple choice question asking "who is at fault? The factory manager? The company CEO? Or the supplier?" Art's input may be a selection of "the factory manager." According to an implementation, a segment of instructional course content may be received from a user. For example, based on Art's input indicating his selection that the factory manager is at fault, instructional course content segment 310 may be presented to Art providing Bobby's viewpoint on why he believes the manager of the factory should be fired. Additionally, Art may provide input describing his viewpoint on why he believes the manager of the factory should be fired and/or describing his response to Bobby's viewpoint. In turn, Art's input may then be presented in a segment of instructional course content to Bobby. In this implementation, the disclosed subject matter allows for a participant-centered model of education consistent with the case method pedagogy in which students play a lead role in their own and each other's learning.

Following presentation of instructional course content segment 304 to Claire, her input may lead to presentation of instructional course content segment 306. In some instances, an objective of the instructional course may be for each user to explore multiple lateral topics, for example to encourage greater depth of analysis. Accordingly, Claire may receive multiple requests for input for example in the form of general probes and questions for exploring multiple topics. Claire's input in response to each of the requests for input may lead to presenting instructional course content segments 305, 307, and 308 to Claire, for example, in a sequence based on the sequence of respective topics addressed in the input received from Claire. Following presentation of instructional course segments 305, 307, and 308, Claire may be asked for her input in response to the questions "what's the moral of this story?" and "why should managers care about these issues?" Claire's responses to both of these questions may be evaluated and determined to be associated with at least one of the final takeaway instructional course segments 309, 310, and 311. As a result, at least one of instructional course segments 309, 310, and 311 may be presented to Claire.

As shown in FIG. 3 and discussed herein, some users may only be presented with a portion of the segments of instructional course content that make up an entire instructional course. In some instances, a user may be presented with all of the instructional course segments 301, 302, 303, 304, 305, 306, 307, 308, 309, 310, 311 over the duration of the instructional course based on the user's input and level of participation.

According to an implementation, generating a segment of instructional content may be based upon a plurality of inputs, each received from a user of a previous segment of instructional content. For example, a segment of instructional content may be a compilation of input received from multiple users in response to a particular request for input provided to each of the users. Additionally, a segment of instructional content may be a compilation of input received from multiple users where the input from each user is related to a particular course topic. Similarly, for an instructional course, each of the segments of instructional course content in the course may be based upon input received from one or more users. For example, as the number of users and number of user inputs received in an instructional course increase, an instructional course provider may store a large volume of discussion points received from users, which could be arranged into topics and could be used to expand the branching points and subject matters covered within the instructional course. According to an implementation, an instructional course could continuously broaden and deepen to add and/or consolidate segments of instructional course content based on input received from users of the course over time. This may result in a dynamic case method instructional course that over time includes illustrative and/or exemplary discussions, questions, answers, and the like; and which is available to users outside of a traditional classroom setting.

According to an implementation of the disclosed subject matter, each user of the instructional course may receive a performance score for his/her performance in the instructional course. For example, the methods and systems described herein may also include generating a performance score for a user based on a variety of factors associated with the user. Examples of these performance factors may include the total number of inputs received from a user (e.g., unprompted or unrequested input), the quality of the inputs received from a user, the total number of inputs received from a user in response to requests for input provided to a user, a comparison of input received from a user with a predetermined exemplary input, and any other factor that may be useful in assessing a user's performance in the course. A performance score may also take into account peer reviews such that each user may be review and/or respond to other user input/responses, and indicate a score other user input/responses. In some cases, the performance score generated for a user may indicate a relative degree of participation by the user in the course, for example, as compared to other users. A performance score may be calculated according to various techniques for evaluating student performance in a course. For example, point values may be defined for each of the activities and inputs received from a user during an instructional course. These point values may be set according a default setting, a system setting, and/or instructor setting, and may be used to generate an overall performance score for each user of the instructional course, individually or as compared to other users of the course.

In an implementation, communication between an instructional course provider and a user may be across one or more bridges between the interfaces. For example, the communications between the instructional course provider and a user may be managed or assisted by a third device, such as, a coordinating device, a local coordinator, a remote server, etc. In such cases, the third device may, for example, present a first segment of instructional course content to a user. The third device may then receive input from the user, in which case, the third device may provide the input from the user to the instructional course provider. The instructional course provider may identify a portion of the input that is associated with a second segment of instructional course content and provide the second segment of instructional course content to the third device to be presented to the user. Alternatively, the third device may identify a portion of the input that is associated with a second segment of instructional course content, and provide an indication of the second segment of instructional course content to the instructional course provider. The instructional course provider may provide the second segment of instructional course content to the third device to be presented to the user or the instructional course provider may present the second segment of instructional course content to the user. Furthermore, more than one intermediate device may be implemented to facilitate communication between an instructional course provider and one or more users.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

Figure 4:
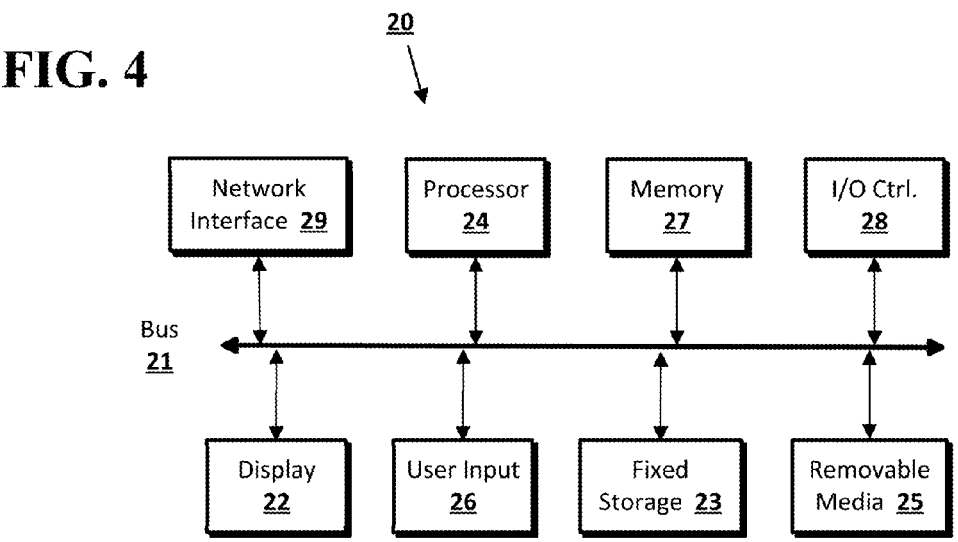
FIG. 4 shows a computer according to an embodiment of the disclosed subject matter.

Embodiments of the presently disclosed subject matter may be implemented in and used with a variety of component and network architectures. FIG. 4 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
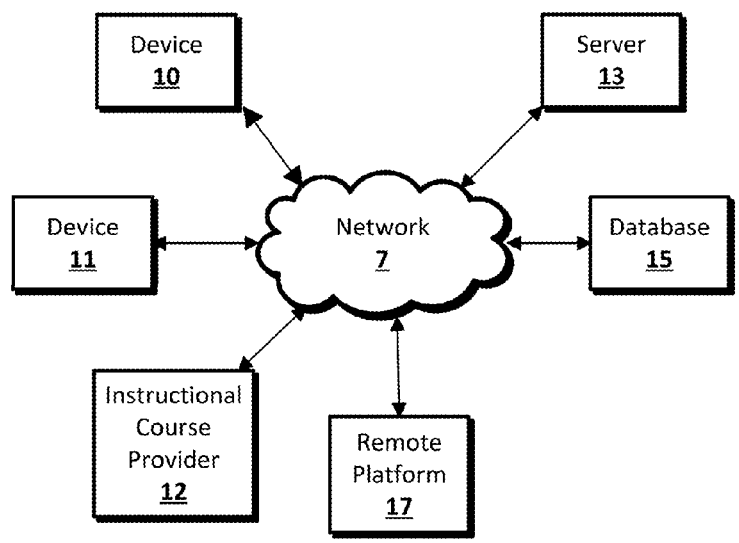
FIG. 5 shows a network configuration according to an embodiment of the disclosed subject matter.

FIG. 5 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more instructional course providers 12, servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more instructional course providers 12, servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
obtaining, by a processor, an instructional course including multiple instructional segments;
providing, by the processor, a first instructional segment of the instructional course to a device of a first user;
receiving, by the processor from the device of the first user, a first input that comprises a first recording that indicates a response to the first instructional segment from the first user;
generating, using an automated speech recognizer, a first transcription of the first recording that indicates a response to the first instructional segment from the first user;
generating, by the processor, a second instructional segment of instructional course content from the first recording that indicates a response to the first instructional segment from the first user;
providing, by the processor, a third instructional segment of the instructional course to a device of a second user;
receiving, by the processor from a device of a second user, a second input that is a second recording that indicates a response to the third instructional segment from the second user;
in response to receiving the second input that is a second recording that indicates a response to the third instructional segment from the second user, generating, using the automated speech recognizer, a second transcription of the second recording that indicates a response to the third instructional segment from the second user;
determining to present the second segment of instructional course content to the second user based on the second transcription of the second recording that indicates a response to the third instructional segment from the second user and the first transcription of the first recording that indicates a response to the first instructional segment from the first user;
presenting, by the processor to the device of the second user, the second segment of instructional course content to the second user;
determining that (i) a third input that is a third recording is received from the device of the second user, (ii) that the third recording indicates a response to the second instruction segment generated from the first recording, and (iii) that the first recording indicates a response to the first instructional segment from the first user; and
in response to determining that (i) a third input that is a third recording is received from the device of the second user, (ii) that the third recording indicates a response to the second instruction segment generated from the first recording, and (iii) that the first recording indicates a response to the first instructional segment from the first user, providing at least a portion of the third recording to the device of the first user.

2. The method of claim 1, wherein determining to present the second segment of instructional course content to the second user based on the second transcription of the second recording that indicates a response to the third instructional segment from the second user and the first transcription of the first recording that indicates a response to the first instructional segment from the first user comprises:
determining that the second transcription includes a predetermined phrase associated with the second instructional segment.

3. The method of claim 1, wherein the instructional segments comprise video.

4. The method of claim 1, wherein the first input comprises a video recording.

5. The method of claim 1, wherein determining to present the second segment of instructional course content to the second user based on the second transcription of the second recording that indicates a response to the third instructional segment from the second user and the first transcription of the first recording that indicates a response to the first instructional segment from the first user comprises:
determining to provide either the second instructional segment or a fourth instructional segment after providing the third instructional segment; and
in response to receiving the second input, determining to provide the second instructional segment.

6. The method of claim 1, comprising:
generating a fourth instructional segment of instructional course content based on the second input that indicates a response to the third instructional segment from the second user.

7. The method of claim 1, comprising:
determining a participation score for the first user based on the first input.

8. A system comprising:
one or more computers; and
one or more storage devices storing instructions that are operable, when executed by the one or more computers, to cause the one or more computers to perform operations comprising:
obtaining, by a processor, an instructional course including multiple instructional segments;
providing, by the processor, a first instructional segment of the instructional course to a device of a first user;
receiving, by the processor from the device of the first user, a first input that comprises a first recording that indicates a response to the first instructional segment from the first user;
generating, using an automated speech recognizer, a first transcription of the first recording that indicates a response to the first instructional segment from the first user;
generating, by the processor, a second instructional segment of instructional course content from the first recording that indicates a response to the first instructional segment from the first user;
providing, by the processor, a third instructional segment of the instructional course to a device of a second user;
receiving, by the processor from a device of a second user, a second input that is a second recording that indicates a response to the third instructional segment from the second user;
in response to receiving the second input that is a second recording that indicates a response to the third instructional segment from the second user, generating, using the automated speech recognizer, a second transcription of the second recording that indicates a response to the third instructional segment from the second user;
determining to present the second segment of instructional course content to the second user based on the second transcription of the second recording that indicates a response to the third instructional segment from the second user and the first transcription of the first recording that indicates a response to the first instructional segment from the first user;
presenting, by the processor to the device of the second user, the second segment of instructional course content to the second user;
determining that (i) a third input that is a third recording is received from the device of the second user, (ii) that the third recording indicates a response to the second instruction segment generated from the first recording, and (iii) that the first recording indicates a response to the first instructional segment from the first user; and
in response to determining that (i) a third input that is a third recording is received from the device of the second user, (ii) that the third recording indicates a response to the second instruction segment generated from the first recording, and (iii) that the first recording indicates a response to the first instructional segment from the first user, providing at least a portion of the third recording to the device of the first user.

9. The system of claim 8, wherein determining to present the second segment of instructional course content to the second user based on the second transcription of the second recording that indicates a response to the third instructional segment from the second user and the first transcription of the first recording that indicates a response to the first instructional segment from the first user comprises:
determining that the second transcription includes a predetermined phrase associated with the second instructional segment.

10. The system of claim 8, wherein the instructional segments comprise video.

11. The system of claim 8, wherein the first input comprises a video recording.

12. The system of claim 8, wherein determining to present the second segment of instructional course content to the second user based on the second transcription of the second recording that indicates a response to the third instructional segment from the second user and the first transcription of the first recording that indicates a response to the first instructional segment from the first user comprises:
determining to provide either the second instructional segment or a fourth instructional segment after providing the third instructional segment; and
in response to receiving the second input, determining to provide the second instructional segment.

13. The system of claim 8, the operations comprising:
generating a fourth instructional segment of instructional course content based on the second input that indicates a response to the third instructional segment from the second user.

14. The system of claim 8, the operations comprising:
determining a participation score for the first user based on the first input.

15. A non-transitory computer-readable medium storing software comprising instructions executable by one or more computers which, upon such execution, cause the one or more computers to perform operations comprising:
obtaining, by a processor, an instructional course including multiple instructional segments;
providing, by the processor, a first instructional segment of the instructional course to a device of a first user;
receiving, by the processor from the device of the first user, a first input that comprises a first recording that indicates a response to the first instructional segment from the first user;
generating, using an automated speech recognizer, a first transcription of the first recording that indicates a response to the first instructional segment from the first user;
generating, by the processor, a second instructional segment of instructional course content from the first recording that indicates a response to the first instructional segment from the first user;
providing, by the processor, a third instructional segment of the instructional course to a device of a second user;
receiving, by the processor from a device of a second user, a second input that is a second recording that indicates a response to the third instructional segment from the second user;
in response to receiving the second input that is a second recording that indicates a response to the third instructional segment from the second user, generating, using the automated speech recognizer, a second transcription of the second recording that indicates a response to the third instructional segment from the second user;
determining to present the second segment of instructional course content to the second user based on the second transcription of the second recording that indicates a response to the third instructional segment from the second user and the first transcription of the first recording that indicates a response to the first instructional segment from the first user;

presenting, by the processor to the device of the second user, the second segment of instructional course content to the second user;

determining that (i) a third input that is a third recording is received from the device of the second user, (ii) that the third recording indicates a response to the second instruction segment generated from the first recording, and (iii) that the first recording indicates a response to the first instructional segment from the first user; and in response to determining that (i) a third input that is a third recording is received from the device of the second user, (ii) that the third recording indicates a response to the second instruction segment generated from the first recording, and (iii) that the first recording indicates a response to the first instructional segment from the first user, providing at least a portion of the third recording to the device of the first user.

16. The medium of claim 15, wherein determining to present the second segment of instructional course content to the second user based on the second transcription of the second recording that indicates a response to the third instructional segment from the second user and the first transcription of the first recording that indicates a response to the first instructional segment from the first user comprises:

determining that the second transcription includes a predetermined phrase associated with the second instructional segment.

17. The medium of claim 15, wherein the instructional segments comprise video.

\* \* \* \* \*